United States Patent

Rasberger et al.

[11] 4,148,783
[45] Apr. 10, 1979

[54] HYDROXYBENZYLMALONIC ACID DERIVATIVES

[75] Inventors: Michael Rasberger, Riehen; Jean Rody, Basel; François Gugumus, Allschwil, all of Switzerland

[73] Assignee: Ciba-Geigy Corporation, Ardsley, N.Y.

[21] Appl. No.: 747,758

[22] Filed: Dec. 6, 1976

[30] Foreign Application Priority Data

Dec. 8, 1975 [CH] Switzerland ............ 15915/75

[51] Int. Cl.² ............ C07D 211/46; C07D 211/58
[52] U.S. Cl. ............ 260/45.8 N; 546/16; 546/188; 546/189
[58] Field of Search ............ 260/293.64, 293.63, 260/293.66, 45.8 N

[56] References Cited

U.S. PATENT DOCUMENTS

| | | | |
|---|---|---|---|
| 3,640,928 | 2/1972 | Murayama et al. | 260/293.63 |
| 3,993,655 | 11/1976 | Rasberger et al. | 260/293.64 |
| 4,021,432 | 5/1975 | Holt et al. | 260/293.64 |
| 4,069,196 | 1/1978 | Ramey et al. | 260/293.63 |
| 4,075,165 | 2/1978 | Soma et al. | 260/293.63 |

Primary Examiner—Natalie Trousof
Assistant Examiner—Robert T. Bond
Attorney, Agent, or Firm—Vincent J. Cavalieri

[57] ABSTRACT

Hydroxybenzylmalonic acid derivatives of 1-acyl-piperidin-4-ols or 1-acyl-4-aminopiperidines respectively having the formula

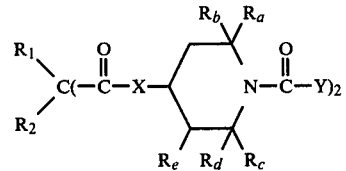

wherein $R_a$, $R_b$, $R_c$, $R_d$ are hydrocarbon residues, $R_e$ is H or lower alkyl, $R_1$ is a hydroxybenzyl residue, $R_2$ is H or $R_1$, X is —O— or —NH— and Y is hydrogen, a hydrocarbon, amino, alkoxy or phenoxy residue are excellent stabilizers for plastics material, especially for polyolefins. They act against heat aging as well as against light aging. The compounds may be prepared by acylation of the corresponding NH compounds or by hydroxybenzylation of the corresponding malonic acid derivatives.

12 Claims, No Drawings

HYDROXYBENZYLMALONIC ACID DERIVATIVES

The invention relates to new derivatives of hydroxybenzylmalonic acids, to their manufacture and to their use as stabilisers for plastics, as well as to the material stabilised therewith.

The compounds concerned are compounds of the formula I

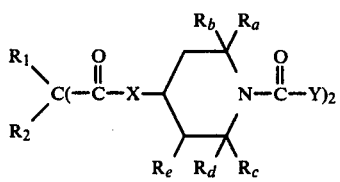

wherein
X can be oxygen or —NH—,
$R_1$ represents a hydroxybenzyl group of the formula II

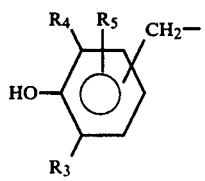

wherein
$R_3$ and $R_4$ each independently represent an alkyl group having 1–9 C-atoms, aralkyl having 7–9 C-atoms or cycloalkyl having 5–8 C-atoms, and $R_5$ represents hydrogen or methyl,
$R_2$ represents, in the case where X is oxygen, hydrogen or a hydroxybenzyl group of the formula II, in the case however where X is —NH— only hydrogen,
Y represents hydrogen, alkyl having 1–17 C-atoms, alkenyl having 2–3 C-atoms, cyclohexyl, phenyl, benzyl, a phenyl or phenylethyl group substituted by 2 alkyl groups each having 1–4 C-atoms and a hydroxyl group, alkylamino having 1–12 C-atoms, dialkylamino having 2–16 C-atoms, anilino, alkoxy having 1–12 C-atoms, benzyloxy or phenoxy,
$R_a$ represents methyl,
$R_b$ represents alkyl having 1–6 C-atoms,
$R_c$ represents alkyl having 1–9 C-atoms, phenyl, benzyl or phenylethyl,
$R_d$ represents alkyl having 1–6 C-atoms, or
$R_c$ and $R_d$ together with the C-atom to which they are bound form a cyclopentane or cyclohexane ring, and
$R_e$ represents hydrogen or alkyl having 1–5 C-atoms, with the number of the C-atoms of $R_e$ being less by 1 than that of $R_b$.

$R_b$, $R_c$ and $R_d$ can be straight-chain or branched-chain alkyl groups having 1–6 or 1–9 C-atoms, such as methyl, ethyl, propyl, butyl, isobutyl, isopentyl or hexyl; $R_c$ can also be, e.g., heptyl, octyl or nonyl. $R_b$, $R_c$ and $R_d$ are preferably methyl.

$R_e$ can be an alkyl group having up to 5 C-atoms, with this group containing 1 C-atom less than $R_b$.

$R_3$ and $R_4$ can be straight-chain or branched-chain alkyl groups having 1–9 C-atoms, such as methyl, ethyl, propyl, n-butyl, isobutyl, tert.butyl, tert.amyl, n-hexyl, 2-ethylhexyl, tert.octyl or n-nonyl.

$R_3$ and $R_4$ can also be aralkyl groups having 7–9 C-atoms, such as benzyl, methylbenzyl or dimethylbenzyl, or cycloalkyl groups having 5–8 C-atoms, such as cyclomethyl, cyclohexyl, methylcyclohexyl, dimethylcyclohexyl or cyclooctyl.

As alkyl having 1–17 C-atoms, Y can be a straight-chain or branched-chain, chiefly primary alkyl group, such as methyl, ethyl, propyl, iso-butyl, n-hexyl, iso-heptyl, n-nonyl, n-undecyl or dodecyl. Y can also be alkenyl having 2–3 C-atoms, such as vinyl, 2-propenyl or 1-propenyl. As a substituted phenyl or phenylethyl group, Y can be, in particular, 4-hydroxy-3,5-di(tert.butyl)-phenyl or 4-hydroxy-3,5-di(tert.butyl)-phenylethyl. If Y represents an alkylamino or dialkylamino radical, then this can be, e.g., methylamino, butylamino, 2-ethyl-hexylamino, dodecylamino, dimethylamino, diethylamino, di(isopropyl)amino, dibutylamino or dioctylamino. As alkoxy having 1–12 C-atoms, Y can be, e.g., methoxy, propoxy, sec.butoxy, hexyloxy, nonyloxy, isodecyloxy or dodecyloxy.

The stabilising of plastics against thermal-oxidative ageing and against light-induced ageing by the addition of compounds of the formula Ia

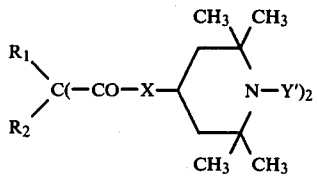

wherein $R_1$, $R_2$ and X have the same meaning as defined for formula I, and Y' represents hydrogen, the radical —O·, an alkyl group having 1–12 C-atoms, an alkenyl group having 3 or 4 C-atoms, a propargyl group, a benzyl group, or a group of the formula

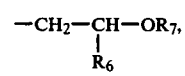

wherein $R_6$ represents hydrogen, methyl or phenyl, and $R_7$ represents hydrogen or an acyl group having up to 18 C-atoms, is known from DT-OS No. 2,456,864. These compounds contain therefore in their molecule an antioxidatively effective phenol group and a piperidine group protecting against light, so that this stabilisation has, in application and effect, an advantage over the known stabilisation obtained with a mixture of piperidine light-stabilisers and phenol antioxidants.

Compared with these known stabilisers of the formula Ia, the stabilisers of the formula I according to the invention differ in that the substituent on the nitrogen atom is an acyl group, from which no stabilising action was to be expected. It was therefore surprising that the new compounds exhibit a substantially improved stabilisation effect, particularly with regard to thermal-oxidative stabilisation.

This is shown from the results of a comparison test in which there was examined the thermal ageing of polypropylene that had been stabilisied with piperidinyl malonates, which in each case differ from each other only with respect to the substituents on the nitrogen atom. The amount used was in each case 0.2%, and the conditions of the test are the same as those subsequently described in Example 11, i.e. the time until commencement of decomposition at 149° C. is measured.

Comparison test I

Stabilisers of the formula

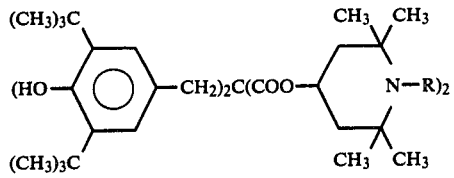

| R = according to | Days until commencement of decomposition at 149° C. |
|---|---|
| H DT-OS 2,456,864 | 20 |
| CH₃ DT-OS 2,456,864 | 24 |
| COCH₃ present invention | 38 |

Comparison test II

Stabilisers of the formula

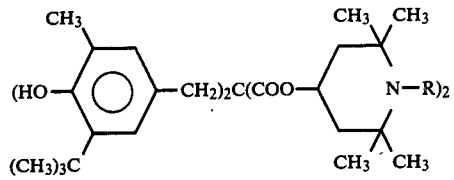

| R = according to | Days until commencement of decomposition at 149° C. |
|---|---|
| H DT-OS 2,456,864 | 21 |
| CH₃ DT-OS 2,456,864 | 34 |
| COCH₃ present invention | 39 |

In addition, the compounds of the formula I have proved to be excellent stabilisers in a number of various polymeric substrates, both against thermal-oxidative ageing and against light-induced ageing, so that the present invention is of great importance for the technology of plastics.

Two classes are preferred among the compounds of the formula I. The one class is para-hydroxybenzyl compounds corresponding to the formula I where $R_1$ represents a group of the formula IIa

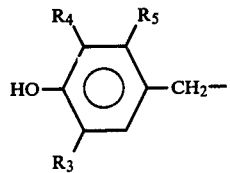
(IIa)

wherein $R_3$ represents an isopropyl, tert.butyl or tert.amyl group, $R_4$ represents a methyl, ethyl, isopropyl, tert.butyl, tert.amyl or tert.octyl group, and $R_5$ represents hydrogen or methyl, $R_2$ is identical to $R_1$ or is hydrogen, and Y in the formula I represents alkyl having 1-4 C-atoms or alkenyl having 2-3 C-atoms.

Particularly preferred compounds among the abovementioned are those wherein $R_3$ represents a tertiary butyl group, $R_4$ a methyl or tert.butyl group, $R_5$ hydrogen, and Y methyl, ethyl, vinyl or propenyl.

The other class of preferred substances is the metahydroxybenzyl compounds of the formula I where $R_1$ represents a group of the formula IIb

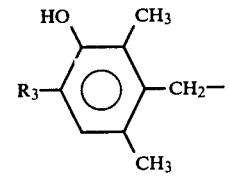
(IIb)

wherein $R_3$ represents a tert.butyl, tert.amyl or tert.octyl group, $R_2$ is identical to $R_1$ or is hydrogen, and Y represents alkyl having 1-4 C-atoms or alkenyl having 2-3 C-atoms.

In both of the classes mentioned, derivatives of specific polyalkylpiperidines are preferred. These are the compounds of the formula I wherein $R_a$, $R_c$ and $R_e$ are methyl, and $R_b$ and $R_d$ are ethyl; and also the compounds wherein $R_a$, $R_b$ and $R_c$ are methyl, $R_e$ is hydrogen and $R_d$ is alkyl having 1-6 C-atoms or phenyl. Particularly preferred, however, are those compounds of the formula I wherein $R_a$, $R_b$, $R_c$ and $R_d$ are methyl, and $R_e$ represents hydrogen.

Examples of compounds of the formula I are:

bis(3,5-di-tert.butyl-4-hydroxybenzyl)malonic acid-bis(1-acetyl-2,2,6,6-tetramethyl-4-piperidinyl)ester,
bis(3,5-di-isopropyl-4-hydroxybenzyl)malonic acid-bis(1-acryl-2,2,6,6-tetramethyl-4-piperidinyl)ester,
bis(3-tert.butyl-4-hydroxy-5-methylbenzyl)malonic acid-bis(1-propionyl-2,2,6,6-tetramethyl-4-piperidinyl)ester,
3,5-di-tert.butyl-4-hydroxybenzylmalonic acid-bis(1-formyl-2,2,6,6-tetramethyl-4-piperidinyl)ester,
3-tert.butyl-4-hydroxy-5,6-dimethylbenzylmalonic acid-bis(1-benzoyl-2,2,6,6-tetramethyl-4-piperidinyl)ester,
bis(3-tert.butyl-4-hydroxy-5,6-dimethylbenzyl)malonic acid-bis(1-butyryl-2,2,6,6-tetramethyl-4-piperidinyl)ester,
3-tert.butyl-4-hydroxy-5,6-dimethylbenzylmalonic acid-bis(1-crotonyl-2,2,6,6-tetramethyl-4-piperidinyl)ester,
bis(3,5-di-tert.butyl-4-hydroxybenzyl)malonic acid-bis(1-acryl-2,2,6,6-tetramethyl-4-piperidinyl)ester,
bis(3,5-di-tert.butyl-4-hydroxybenzyl)malonic acid-bis(1-capryl-2,2,6,6-tetramethyl-4-piperidinyl)ester,
bis-(3,5-di-tert.butyl-4-hydroxybenzyl)malonic acid-bis(1-phenylacetyl-2,2,6,6-tetramethyl-4-piperidinyl)ester, bis(3,5-di-tert.butyl-4-hydroxybenzyl)malonic acid-bis[1-(3,5-di-tert.butyl-4-hydroxybenzoyl)-2,2,6,6-tetramethyl-4-piperidinyl]ester, bis(3,5-di-tert.butyl-4-hydroxybenzyl)malonic acid-bis[1-(3,5-di-tert.butyl-4-hydroxyphenyl-β-propionyl)-2,2,6,6-tetramethyl-4-piperidinyl]ester, bis(3,5-di-tert.butyl-4-hydroxybenzyl)malonic acid-bis(1-methylaminocarbonyl-2,2,6,6-tetramethyl-4-piperidinyl)ester, bis(3,5-di-tert.butyl-4-hydroxybenzyl)malonic acid-bis(1-dodecylaminocarbonyl-2,2,6,6-tetramethyl-4-piperidinyl)ester, bis(3,5-di-tert.butyl-4-hydroxybenzyl)malonic acid-bis(1-diethylaminocarbonyl-2,2,6,6-tetramethyl-4-piperidinyl)ester, bis(3,5-di-tert.butyl-4-hydroxybenzyl)malonic acid-bis(1-dibutylaminocarbonyl-2,2,6,6-tetramethyl-4-piperidinyl)ester, bis(3,5-di-tert.butyl-4-hydroxybenzyl)malonic acid-bis(1-propoxycarbonyl-2,2,6,6-tetramethyl-4-piperidinyl)ester, bis(3,5-di-tert.butyl-4-hydroxybenzyl)malonic acid-bis(1-decyloxycarbonyl-2,2,6,6-tetramethyl-4-piperidinyl)ester, bis(3,5-di-tert.butyl-4-hydroxybenzyl)malonic acid-bis(1-phenoxycarbonyl-2,2,6,6-tetramethyl-4-piperidinyl)ester, bis(3,5-di-tert.butyl-4-hydroxybenzyl)malonic acid-bis(1-butyryl-2,3,6-trimethyl-2,6-diethyl-4-piperidinyl)ester, bis(3,5-di-tert.butyl-4-hydroxybenzyl)malonic acid-bis(1-acetyl-2,2-dimethyl6,6-pentamethylene-4-piperidinyl)ester, bis(3,5-di-tert.butyl-4-hydroxybenzyl)malonic acid-bis(1-propionyl-2,2,6-trimethyl-6-ethyl-4-piperidinyl)ester, 3,5-di-tert.butyl-4-hydroxybenzylmalonic acid-N,N'-bis-(1-acetyl-2,2,6,6-tetramethyl-4-piperidinyl)-diamide, 3,5-di-tert.butyl-4-hydroxybenzylmalonic acid-N,N'-bis(1-formyl-2,2,6,6-tetramethyl-4-piperidinyl)-diamide, 3,5-di-tert.butyl-4-hydroxybenzylmalonic acid-N,N'-bis-(1-crotonyl-2,2,2,6-tetramethyl-4-piperidinyl)-diamide, 3-tert.butyl-5-methyl-4-hydroxybenzylmalonic acid-N,N'-bis(1-caprinoyl-2,2,6,6-tetramethyl-4-piperidinyl)-diamide, 3-tert.butyl-5-methyl-4-hydroxybenzylmalonic acid-N,N'-bis(1-cyclohexanecarbonyl-2,2,6,6-tetramethyl-4-piperidinyl)-diamide, 3,5-di-tert.butyl-4-hydroxybenzylmalonic acid-N,N'-bis(1-acryl-2,3,6-trimethyl-2,6-diethyl-4-piperidinyl)-diamide, 4-tert.butyl-3-hydroxy-2,6-dimethylbenzylmalonic acid-bis(1-acetyl-2,2,6,6-tetramethyl-4-piperidinyl)ester, 4-tert.butyl-3-hydroxy-2,6-dimethylbenzylmalonic acid-bis(1-acryl-2,2,6,6-tetramethyl-4-piperidinyl)ester, bis(4-tert.butyl-3-hydroxy-2,6-dimethylbenzyl)malonic acid-bis-(1-butyryl-2,2,6,6-tetramethyl-4-piperidinyl)ester, bis(4-tert.butyl-3-hydroxy-2,6-dimethylbenzyl)malonic acid-bis(1-methoxycarbonyl-2,2,6,6-tetramethyl-4-piperidinyl) ester, 4-tert.butyl-3-hydroxy-2,6-dimethylbenzylmalonic acid-N,N'-bis-(1-formyl-2,2,6,6-pentamethyl-4-piperidinyl)diamide, 4-tert.butyl-3-hydroxy-2,6-dimethylbenzylmalonic acid-N,N'-bis(1-crotonyl-2,2,6,6-pentamethyl-4-piperidinyl)diamide, bis(3-α,α-dimethylbenzyl-5-tert.butyl-4-hydroxybenzyl)malonic acid-bis-(1-acetyl-2,2,6,6-tetramethyl-4-piperidinyl)ester, bis(3-α,α-dimethylbenzyl-5-tert.butyl-4-hydroxybenzyl)malonic acid-bis-(1-methacryl-2,3,6-trimethyl-2,6-diethyl-4-piperidinyl)ester, 3-α,α-dimethylbenzyl-5-tert.butyl-4-hydroxybenzylmalonic acid-bis-(1-butyryl-2,2,6-trimethyl-6-isobutyl-4-piperidinyl)ester, 3-α,α-dimethylbenzyl-5-tert.butyl-4-hydroxybenzylmalonic acid-N,N'-bis(1-dimethylaminocarbonyl-2,2,6,6-tetramethyl-4-piperidinyl)diamide, bis(3-tert.amyl-5-methyl-4-hydroxybenzyl)malonic acid-bis-(1-decanoyl-2,2,6,6-tetramethyl-4-piperidinyl)ester, 3-tert.amyl-5-methyl-4-hydroxybenzylmalonic acid-bis-(1-ethoxycarbonyl-2,2,6,6-tetramethyl-4-piperidinyl)ester, 3-tert.amyl-5-methyl-4-hydroxybenzylmalonic acid-N,N'-bis(1-dodecylaminocarbonyl-2,2,6,6-tetramethyl-4-piperidinyl)-diamide, and bis(3-tert.nonyl-5-methyl-4-hydroxybenzyl)malonic acid-bis(1-acryl-2,6-dimethyl-2,6-dibutyl-5-propyl-4-piperidinyl) ester.

The compounds of the formula I can be produced by various processes. The most important process is one wherein a malonic acid derivative of the formula III

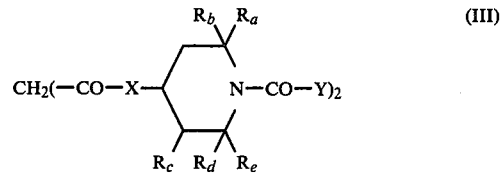

is reacted in the case where X is oxygen with one mole or two moles, and in the case where X is —NH— with one mole, of an N-dialkyldithiocarbamate of the formula $R_1$—S—C(S)—N($R_8$)$_2$, or a hydroxybenzyl halide of the formula $R_1$—Hal, or of a hydroxybenzylamine of the formula $R_1$—N($R_8$)$_2$, in the presence of a basic catalyst, whereby in the above formulae the symbols $R_1$, X and Y have the same meanings as defined for formula I, $R_8$ represents an alkyl radical having 1-4 C-atoms, or the two radicals $R_8$ together with the N-atom form a morpholine, piperidine or pyrrolidine ring, and Hal represents chlorine, bromine or iodine.

The starting substances of the formula III are malonic acid esters and malonic acid amides of 4-hydroxy- and 4-amino-1-acylpiperidines, respectively. They are obtainable by usual methods, for example by means of base-catalysed transesterification of diethylmalonate with 2 moles of a 4-hydroxy- and 4-amino-1-acylpiperidine, respectively. The compounds of the formula $R_1$—S—C(S)—N($R_8$)$_2$ are obtainable by reaction of a phenol of the formula

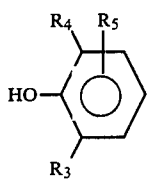

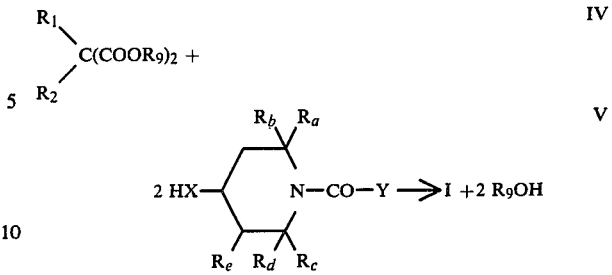

with formaldehyde, carbon disulphide and a secondary amine $(R_8)_2NH$.

The reaction of the compounds III with the dithiocarbamates can be performed in the case of the esters (X=O) in the molar ratio of 1:1 or 1:2. In the former case there are obtained the monohydrobenzyl compounds of the formula I wherein $R_2$ is H; in the latter case there are obtained the di-hydroxybenzyl compounds of the formula I wherein $R_2=R_1$. With regard to the amides (X=—NH—), the reaction ceases, even with the use of more than 1 mole of dithiocarbamate, at the first stage, so that in this case there are obtained only the final products wherein $R_2$ is H. Suitable basic catalysts are, for example, alkali hydroxides such as NaOH or KOH; alkali or alkaline-earth alkoxides such as $CH_3ONa$, $(CH_3)_3COK$, $(C_2H_5O)_2Mg$ or $(CH_3)_2CHOLi$; alkali or alkaline-earth hydrides such as LiH, NaH or $CaH_2$; and alkali amides such as $NaNH_2$, $LiNH_2$ or $KNH_2$. Alkali hydroxides are preferably used. These bases are preferably employed in equimolar amounts, i.e. there is used per mole of dithiocarbamate one mole-equivalent of the base. The reaction can be performed in solution, a condition which ensures a better temperature control, and which is to be recommended particularly in the case of high-melting starting constituents. Suitable solvents are, for example, alcohols such as methanol, ethanol, isopropanol or tert. butanol; also suitable are aliphatic ethers or cyclic ethers such as diethyl ether, tetrahydrofuran or dioxane; also hydrocarbons such as hexane, heptane, ligroin, decalin, cyclohexane, benzene, toluene or xylene; as well as polar aprotic solvents such as dimethylformamide, dimethylacetamide or dimethylsulphoxide. The last-mentioned group of solvents is to be recommended in particular with use of the malonamides of the formula III, X=—NH—.

Instead of the dithiocarbamates, it is possible to use the hydroxybenzyl halides $R_1$—Hal. In this case the malonic ester III is firstly converted by reaction with equivalent amounts of alkali metal, alkali alkoxide or alkali amide, or of a similar alkali reagent, into the alkali compound of III, which is subsequently reacted with the halogen compound. This method is well suited in particular for the introduction of meta-hydroxybenzyl groups.

Finally, the radical $R_1$ can be introduced also by means of the hydroxybenzylamines of the formula $R_1$—$N(R_8)_2$. Suitable catalysts are the same alkali reagents as were described in the foregoing; alkali amides and alkali alcoholates are preferably used. They are used however not in stoichiometric amounts but in catalytic amounts, approximately in amounts of 0.1 to 5 mol-%. In place of the amines, it is possible to use also the quaternisation products thereof.

A further process for the production of compounds of the formula I comprises reacting a malonic acid dialkyl ester of the formula IV with two moles of a piperidine derivative of the formula V

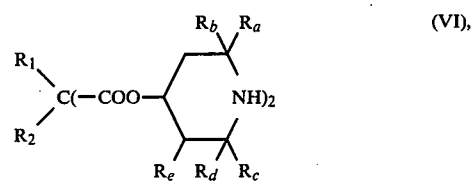

$R_9$ represents in this case an alkyl radical having 1-4 C-atoms. Suitable catalysts are the same bases as were specified in the foregoing. In this process too, the reaction can be performed in a solvent, and, apart from the alcohols, all the previously mentioned groups of solvents are suitable.

The N-acylpiperidine derivatives of the formula V are obtainable by methods known per se; for example by N-acylation of the corresponding polyalkyl-4-oxopiperidines and subsequent reduction or reductive amination of the acylated piperidones.

Finally, it is also possible to firstly produce, with the aid of the methods described above, the malonic esters unsubstituted on the nitrogen atom, of the formula VI $$\begin{matrix} R_1 \\ \phantom{R}\diagdown \\ \phantom{RRR}C(-COO-\!\!\!\!\!\!\begin{matrix}R_b\phantom{R}R_a\\ \diagup\diagdown\\ \phantom{RR}\\ \diagdown\diagup\\ R_e\phantom{R}R_d\phantom{R}R_c\end{matrix}\!\!\!\!\!NH)_2 \\ \phantom{R}\diagup \\ R_2 \end{matrix} \quad (VI),$$

which are the subject of DT-OS No. 2,456,864, and to subject these to an N-acylation by methods known per se, for example by reaction with carboxylic acid anhydrides or with acid chlorides of the formula Y—CO—Cl. This method is suitable in particular for such compounds in which $R_1$ and $R_2$ are hydroxybenzyl groups of the formula II.

In the case of the methods of procedure discussed here, the reaction is performed usually at elevated temperature, in order to ensure a rapid and complete course of reaction. The isolation of the products can be effected by methods known per se; for example by means of concentration by evaporation, and crystallisation of the residue.

The compounds of the formula I can be used according to the present invention as stabilisers for plastics to protect these from damage caused by the action of oxygen, heat and light. Examples of such plastics are the polymers listed in DT-OS No. 2,456,864 on pages 12–14.

Of particular importance is the stabilisation of polyolefins, styrene polymers and polyurethanes, for which the malonates of the formula I are excellently suitable. Examples are polyethylene of high and low density, polypropylene, ethylene/propylene copolymers, polystyrene, styrene/butadiene/acrylonitrile copolymers, mixtures of polyolefins or of styrene polymers, polyurethanes based on polyether or polyester, in the form of lacquers, elastomers or foam plastics.

The stabilisers are added to the plastics at a concentration of 0.01 to 5 percent by weight, calculated on the material to be stabilised. There is preferably incorporated into the material 0.03 to 1.5, particularly preferably 0.2 to 0.6, percent by weight of the compounds, relative to the material to be stabilised.

Incorporation can be effected after polymerisation, for example by the mixing of the compounds and, optionally, further additives into the melt, by methods normally used in industry, either before or during moulding; or by application of the dissolved or dispersed compounds to the polymers, optionally with subsequent removal of the solvent by evaporation.

The new compounds can be added also in the form of a master batch, which contains these compounds for example at a concentration of 2.5 to 25 percent by weight, to the plastics to be stabilised.

In the case of cross-linked polyethylene, the compounds are added before cross-linking.

In addition to the compounds of the formula I, there can be added to the plastics also known stabilisers or co-stabilisers. These can be, e.g., antioxidants, light-stabilisers or metal-deactivators; or co-stabilisers such as those of the phosphorous acid ester type. There can also be added other additives common in plastics technology, such as flameproofing agents, antistatic agents, plasticisers, lubricants, blowing agents, pigments, reinforcing substances or fillers.

Such known and commonly used additives are compatible with the stabilisers of the formula I, and in certain cases they can lead to an increase of the effectiveness of the new stabilisers.

The invention therefore relates also to the plastics stabilised by the addition of 0.01 to 5 percent by weight of a compound of the formula I, which plastics can if required also contain known conventional additives. The plastics stabilised in this manner can be employed in the most varied forms, e.g. as sheet, fibres, tapes or profiles, or as binders for lacquers, adhesives or cements.

The manufacture and use of the compounds of the invention are further illustrated in the following Examples. The term 'parts' denotes parts by weight, and % denotes percent by weight. Temperature values are given in degrees Centigrade.

EXAMPLES 1 and 2

23.2 g of bis(1-acetyl-2,2,6,6-tetramethyl-4-piperidinyl) malonate (0.05 mole) and 36.7 g of N-diethyl-S-(3,5-di-tert.butyl-4-hydroxybenzyl)-dithiocarbamate (0.1 mole) are dissolved in 100 ml of ethanol. There is then added dropwise at 60° in the course of 15 minutes, with stirring, 4 g of NaOH (0.01 mole) in 20 ml of water. The reaction mixture is subsequently refluxed for 2 hours. After cooling to 50°, it is neutralised with 72 ml of 1% acetic acid and cooled to 0°, whereupon the product crystallises out. After filtration and drying, there is obtained bis(3,5-di-tert.butyl-4-hydroxybenzyl)-malonic acid-bis(1-acetyl-2,2,6,6-tetramethyl-4-piperidinyl)ester, m.p. 202°.

In an analogous manner there is obtained bis(3-methyl-5-tert.butyl-4-hydroxybenzyl)malonic acid-bis(1-acetyl-2,2,6,6-tetramethyl-4-piperidinyl)ester, which melts at 189°.

EXAMPLES 3 and 4

23.2 g of bis(1-acetyl-2,2,6,6-tetramethyl-4-piperidinyl) malonate (0.05 mole) and 13.1 g of N-dimethyl-3,5-di-tert.butyl-4-hydroxybenzylamine (0.05 mole) are dissolved in 150 ml of toluene. After the addition of 0.5 g of lithiumamide, the mixture is refluxed for 3 hours. After cooling, it is neutralised with 1.5 ml of 1% acetic acid, and the organic phase is repeatedly washed with water; it is then dried over $Na_2SO_4$ and concentrated in vacuo to obtain, as an oily residue, 3,5-di-tert.butyl-4-hydroxybenzyl-malonic acid-bis(1-acetyl-2,2,6,6-tetramethyl-4-piperidinyl) ester.

In an analogous manner there is obtained the 3,5-di-tert.butyl-4-hydroxymalonic acid-bis(1-acryl-2,2,6,6-tetramethyl-4-piperidinyl)ester.

EXAMPLE 5

27.5 g of bis(1-acetyl-2,3,6-trimethyl-2,6-diethyl-4-piperidinyl)malonate (0.05 mole) and 36.7 g of N-diethyl-S-(3,5-di-tert.butyl-4-hydroxybenzyl)-dithiocarbamate (0.1 mole) are dissolved in 100 ml of isopropanol. There is then added dropwise, with stirring, a solution of 4 g of NaOH (0.1 mole) in 20 ml of water, and the reaction mixture is subsequently refluxed for 2 hours. After cooling, it is neutralised with 72 ml of 1% acetic acid, and 500 ml of water is added. Extraction is then performed with ether, the ether solution is dried over $Na_2SO_4$, and concentrated by evaporation. There is obtained, as oily residue, the bis(3,5-di-tert.butyl-4-hydroxybenzyl)malonic acid-bis(1-acetyl-2,3,6-trimethyl-2,6-diethyl-4-piperidinyl)ester.

Analysis: calculated: C, 74.2%; H, 10.0%; N, 2.84%.
found: C, 74.6%; H, 9.8%; N, 2.50%.

EXAMPLES 6-10

40.8 g of bis-(3,5-di-t-butyl-4-hydroxybenzyl)-malonic acid-bis(2,2,6,6-tetramethyl-4-piperidinyl)-ester (0.05 mole) and 11 g (0.11 mole) of acrylic acid chloride in 250 ml of toluene are heated at 80° C. for 24 hours. After cooling to room temperature, there is added to the solution 15.2 ml of triethylamine, and the temperature is again maintained at 80° C. for a further 24 hours. The hydrochloride is then separated and the filtrate is concentrated in a rotary evaporator. The resulting bis-(3,5-di-t-butyl-4-hydroxybenzyl)-malonic acid-bis(1-acryl-2,2,6,6-tetramethyl-4-piperidinyl)-ester (Example 6) melts at 124° C.

The following compounds are obtained analogously:
bis(3-methyl-5-tert.butyl-4-hydroxybenzyl)-maleic acid-bis (1-acetyl-2,3,6-trimethyl-2,6-diethyl-4-piperidinyl)-ester in the form of amorphous powder (Example 7);
found: N: 2.7; calculated: N: 2.84%;
bis(3,5-di-t.-butyl-4-hydroxy-benzyl)-malonic acid-bis-(1-propionyl-2,2,6,6-tetramethylpiperidinyl)-ester in the form of amorphous powder (Example 8);
mass spectrum: $M^{\oplus}$ 931;
bis(3,5-di-tert-butyl-4-hydroxybenzyl)-malonic acid-bis (1-acryl-2,3,6-trimethyl-2,6-diethyl-4-piperidinyl)-ester in the form of amorphous powder (Example 9);
found: N: 2.8%; calculated: N: 3.02%;
N,N'-bis(1-acetyl-2,2,6,6-tetramethyl-piperidin-4-yl)-3,5-di-tert.butyl-4-hydroxybenzylmalonic acid diamine (Example 10); m.p. 216° C.

EXAMPLE 11

100 parts of polypropylene (melt index 3.2 g/10 min., 230°/2160 g) are thoroughly mixed for 10 minutes, in a shaking apparatus, with 0.2 part of one of the stabilisers given in the following Table 1. The mixture obtained is kneaded in a Brabender plastograph at 200° C. for 10 minutes; the material obtained in this manner is pressed out in a platen press at 260° platen temperature to form 1 mm thick sheets, from which are stamped strips 1 cm wide and 17 cm long.

The test for effectiveness of the stabilizers contained in the test strips is carried out by heat ageing in an air-circulation furnace at 135° and 149°, with an additive-free test strip serving as a comparison. Three test strips are used for each formulation. The end point of the test is defined as being the point at which an easily visible crumbling of the test strip commences. The results are given in Table 1.

Table 1

| Stabiliser Example No. | Days until decomposition commences | |
|---|---|---|
| | at 149° | at 135° |
| none | 1 | 3 |
| 1 | 38 | 84 |
| 2 | 39 | 80 |

EXAMPLE 12

100 Parts of polypropylene powder (Moplen, fibre grade, Montedison) are homogenised with 0.2 part of β-(3,5-di-tert.butyl-4-hydroxyphenyl)propionic acid-octadecyl ester and 0.25 part of a stabiliser from the following Table 2 at 200° in a Brabender plastograph for 10 minutes. The mixture thus obtained is removed as quickly as possible from the kneading machine, and is then pressed out in a toggle press to give a 2 to 3 mm thick sheet. A portion of the pressed out sheet obtained is cut out and subsequently pressed between two highly polished hard-aluminium sheets in a hand-hydraulic laboratory press for 6 minutes at 260° under a pressure of 12 tons to form a sheet having a thickness of 0.5 mm; the sheet is quenched immediately in cold water. From this 0.5 mm thick sheet there are prepared under exactly identical conditions the 0.1 mm thick test sheet. Test specimens each 60×44 mm in size are then stamped out from this sheet, and are irradiated in a Xenotest 150. At regular intervals of time, these specimens are removed from the irradiation apparatus and tested in an IR-spectrophotometer for their carbonyl content. The increase of the carbonyl extinction on irradiation is a measure for the photooxidative degradation of the polymer (see L. Balaban et al., J. Polymer Sci. Part C, 22, 1059–1071 (1969); J. F. Heacock, J. Polymer Sci. Part A-1, 22, 2921-34 (1969); D. J. Carlsson and D. M. Wiles, Macromolecules 2, 587–606 (1969)), and from experience is associated with a decrease of the mechanical properties of the polymer. The time until attainment of a carbonyl extinction of about 0.3, at which the comparison sheet is brittle, is taken as a measure of the protective action.

The protective action of the stabilisers of the invention can be clearly seen from the following Table 2.

Table 2

| Stabiliser Example No. | Irradiation time in hours until carbonyl extinction 0.300 |
|---|---|
| none | 1400 |
| 1 | 5830 |
| 2 | 4010 |
| 6 | 5130 |

We claim:
1. A compound of the formula I,

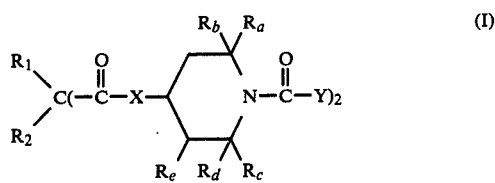

wherein
X can be oxygen or —NH—,
$R_1$ represents a hydroxybenzyl group of the formula II

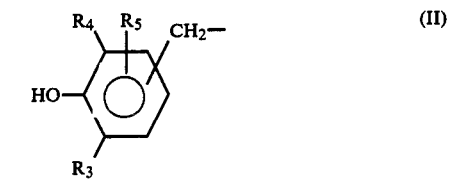

wherein
$R_3$ and $R_4$ each independently represent an alkyl group having 1-9 C-atoms, aralkyl having 7-9 C-atoms or cycloalkyl having 5-8 C-atoms, and
$R_5$ represents hydrogen or methyl,
$R_2$ represents, in the case where X is oxygen, hydrogen or a hydroxybenzyl group of the formula II, in the case however where X is —NH—only hydrogen,
Y represents hydrogen, alkyl having 1-17 C-atoms, alkenyl having 2-3 C-atoms, cyclohexyl, phenyl, benzyl, a phenyl or phenylethyl group substituted by 2 alkyl groups each having 1-4 C-atoms and a hydroxyl group, alkylamino having 1-12 C-atoms, dialkylamino having 2-16 C-atoms, anilino, alkoxy having 1-12 C-atoms, benzyloxy or phenoxy,
$R_a$ represents methyl,
$R_b$ represents alkyl having 1-6 C-atoms,
$R_c$ represents alkyl having 1-9 C-atoms, phenyl, benzyl or phenylethyl,
$R_d$ represents alkyl having 1-6 C-atoms, or
$R_c$ and $R_d$ together with the C-atom to which they are bound form a cyclopentane or cyclohexane ring, and
$R_e$ represents hydrogen or alkyl having 1-5 C-atoms, with the number of the C-atoms of $R_e$ being less by 1 than that of $R_b$.

2. A compound according to claim 1 of the formula I wherein
$R_1$ represents a hydroxybenzyl group of the formula IIa

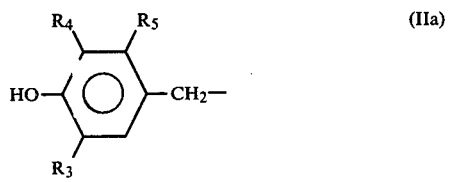

$R_2$ is hydrogen, or, in the case where X is —O—, can also be identical to $R_1$,
$R_3$ represents an isopropyl, tert.butyl or tert.amyl group,
$R_4$ represents a methyl, ethyl, isopropyl, tert.butyl, tert.amyl or tert.octyl group, and
$R_5$ represents hydrogen or methyl, and Y represents alkyl having 1–4 C-atoms or alkenyl having 2–3 C-atoms.

3. A compound according to claim 2 of the formula I wherein $R_3$ represents tert.butyl, $R_4$ represents methyl or tert.butyl, $R_5$ represents hydrogen, and Y represents methyl, ethyl, vinyl or propenyl.

4. A compound according to claim 1 of the formula I wherein $R_1$ is a hydroxybenzyl group of the formula IIb,

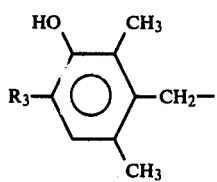

$R_2$ is hydrogen, or, in the case where X is —O—, can also be identical to $R_1$, $R_3$ represents tert.butyl, tert.amyl or tert.octyl, and Y represents alkyl having 1–4 C-atoms or alkenyl having 2–3 C-atoms.

5. A compound according to claim 1, of the formula I wherein $R_a$, $R_c$ and $R_e$ are methyl, and $R_b$ and $R_d$ are ethyl.

6. A compound according to claim 1, of the formula I wherein $R_a$, $R_b$ and $R_c$ are methyl, $R_e$ is hydrogen, and $R_d$ is alkyl having 1–6 C-atoms or phenyl.

7. A compound according to claim 1, of the formula I wherein $R_a$, $R_b$, $R_c$ and $R_d$ are methyl, and $R_e$ is hydrogen.

8. Process for the stabilization of plastics, against thermal-oxidative ageing and light-induced ageing, which process comprises the use of a compound of the formula I according to claim 1.

9. Plastics material stabilised against thermal-oxidative ageing and light-induced ageing, which material contains 0.01–5 percent by weight of a compound of the formula I according to claim 1.

10. Stabilised plastics material according to claim 9, which material contains 0.03–1.5, preferably 0.2–0.6, percent by weight of a compound of the formula I according to claim 1.

11. Stabilised plastics material according to claim 9, which material contains, in addition, other stabilisers or other usual additives.

12. The compound of claim 1, bis(3,5-di-tert.butyl-4-hydroxybenzyl)-malonic acid-bis(1-acetyl-2,2,6,6-tetramethyl-4-piperidinyl)ester.

* * * * *